(12) United States Patent
Burnside

(10) Patent No.: US 6,578,152 B1
(45) Date of Patent: Jun. 10, 2003

(54) DUAL POWER SWITCHING NETWORK SYSTEM FOR ISOLATING BETWEEN DIFFERENT POWER SUPPLIES AND APPLYING APPROPRIATE POWER SUPPLY TO A CONNECTED PERIPHERAL DEVICE

(75) Inventor: Michael C. Burnside, South Weber, UT (US)

(73) Assignee: Iomega Corporation, Roy, UT (US)

(*) Notice: Subject to any disclaimer, the term of this patent is extended or adjusted under 35 U.S.C. 154(b) by 0 days.

(21) Appl. No.: 09/497,380

(22) Filed: Feb. 4, 2000

(51) Int. Cl.[7] .................................................. G06F 1/26
(52) U.S. Cl. ............................. 713/300; 710/62; 326/34
(58) Field of Search ................................. 713/300, 323, 713/324, 330, 340; 710/62, 63; 320/116; 326/34, 49; 327/543, 546

(56) References Cited

U.S. PATENT DOCUMENTS

| | | | | |
|---|---|---|---|---|
| 5,517,153 A | * | 5/1996 | Yin et al. ..................... | 327/546 |
| 5,809,520 A | | 9/1998 | Edwards et al. ............. | 711/115 |
| 5,818,200 A | * | 10/1998 | Cummings et al. .......... | 320/116 |
| 5,935,224 A | * | 8/1999 | Svancarek et al. ............ | 710/63 |
| 6,144,566 A | * | 11/2000 | Keller .......................... | 363/21 |
| 6,246,596 B1 | * | 6/2001 | Yamazaki ..................... | 363/49 |

OTHER PUBLICATIONS

IEEE Computer Society, Sponsored by Microprocessor and Microcomputer Standards Committee, "IEEE Standard for a High Performance Serial Bus", Aug. 30, 1996, 1394–1995.

* cited by examiner

*Primary Examiner*—Thomas Lee
*Assistant Examiner*—Thuan Du
(74) *Attorney, Agent, or Firm*—Woodcock Washburn LLP

(57) ABSTRACT

In a computer system in which a peripheral device is connected to a host computer through two busses each of which has a power supply, a power switching network turns first and second solid state switching devices (FET's) on and off to supply power to the drive. The body diodes of the FET's isolate one power supply from the other and supply power to a controller which turns the FET's on and off. A time constant circuit turns an FET on gradually and a resistor connected between the gate and source of each FET provide enough voltage to turn the FET off if the bus carries a sleep mode signal.

8 Claims, 6 Drawing Sheets

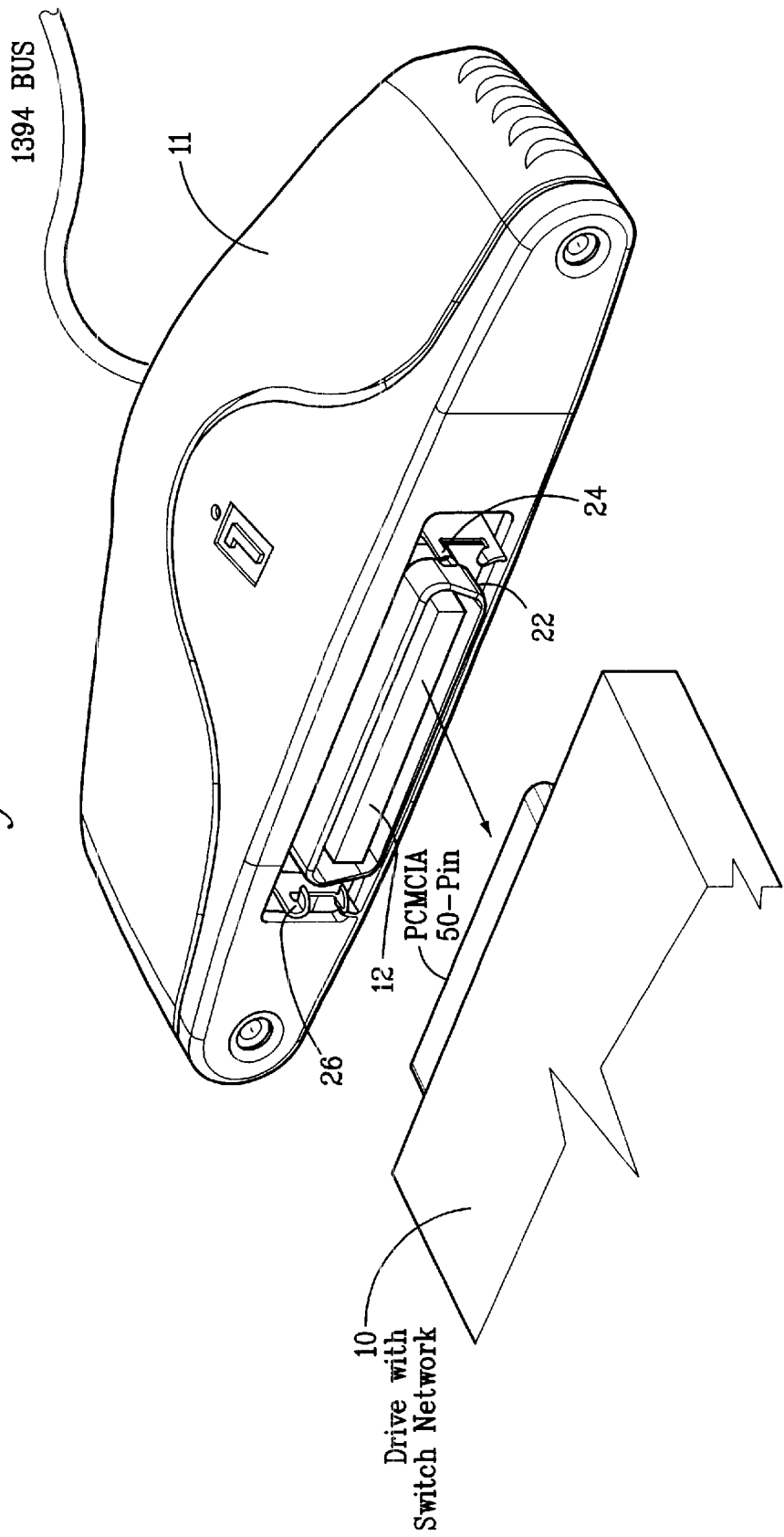

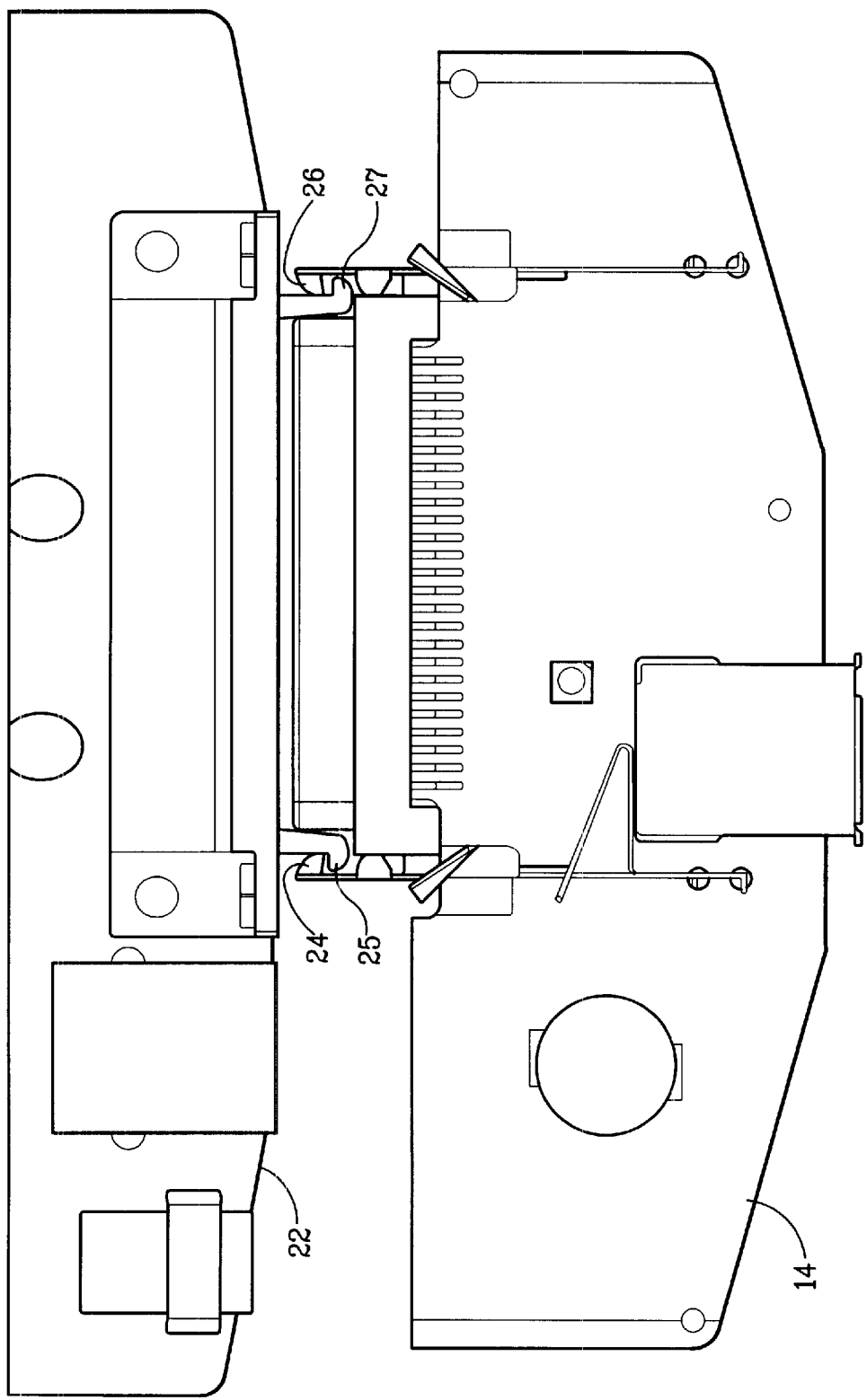

DUAL POWER SWITCHING NETWORK SYSTEM FOR ISOLATING BETWEEN DIFFERENT POWER SUPPLIES AND APPLYING APPROPRIATE POWER SUPPLY TO A CONNECTED PERIPHERAL DEVICE

This invention relates to a power switching network for a computer system in which peripheral devices receive power from first and second busses.

BACKGROUND OF THE INVENTION

Computer systems increasingly include a hierarchy of peripheral devices. The peripheral devices are connected to the host computer through connectors having different configurations.

Electrical connectors and busses interconnect various peripheral devices, particularly computer storage devices. U.S. Pat. No. 5,809,520 Edwards et al. and related patents and applications show and describe various storage devices such as disk drives. Zip™, Zip Notebook, and CLIK!™ drives are typical storage devices which are interconnected in a computer system by electrical cables which have standardized connectors.

The Universal Serial Bus follows a protocol defined in the Universal Serial Bus Specification (USB Spec). The USB Spec provides a standardized approach for peripheral interconnections with a host computer. The USB is set up in a tiered topology with a host on the top tier and USB hubs and functions on subsequent tiers. Each USB device, whether it be a hub or a function, has associated therewith a serial interface engine (SIE) which provides an interface between the hub or function and the transceiver which transmits or receives signals across the serial line. Generally, the SIE takes care of all the USB low level protocol matters such as bit stuffing, cycle redundancy checks (CRCs), token generation, and handshaking. ATAPI is a standard for the connectors, sometimes referred to as Centronics connectors, used to interconnect the peripherals and the host computer.

The IEEE 1394-1995 standard was adopted on Dec. 12, 1995 by the Institute of Electrical and Electronic Engineers, 345 East 47th Street, New York, N.Y. 10017-2394. A copy of that standard is available from the IEEE. The standard is widely known in the industry of digital video, particularly since IEEE-1394-1995, also known as Fire Wire ™ (trademark of Apple Computer, Inc., Cupertino, Calif. 95014), has been adopted as the standard for connecting digital video cameras and other digital video devices in the consumer and professional markets. The contents of that standard are incorporated herein by reference (IEEE 1394 Specification).

Peripheral devices, such as the ZIP™, drive may have dual bus capabilities. As an example the busses may be PCMCIA (Personal Computer Memory Card International Association) and USB (Universal Serial Bus). Because each bus is capable of supplying enough power for operation, the system must have circuitry to handle both power supplies and consequently the isolation between each.

The ASIC (Application Specific Integrated Circuit), for such a system is the USB controller which provides the necessary inputs into the power switching circuit to provide seamless transition between either supply.

Accordingly, it is an object of the present invention to provide isolation between the power supplies on the dual busses of a computer system.

SUMMARY OF THE INVENTION

In accordance with the present invention a computer system includes peripheral devices which can be connected to first and second busses having first and second power supplies respectively. A power switching network includes first and second solid state switching devices which connect the first power supply to the peripheral device when the second power supply is not connected to the peripheral device. The second power supply is connected directly to the peripheral device and supplies power thereto when it is connected.

Further in accordance with the invention the switching devices are field effect transistors (FET's) having an inherent body diode. If the user requires the use of the first bus (USB) the controller ASIC provides signals which turn on the FETs in the power switching circuit. Taking advantage of the body diode inherent in the FET's, the controller is immediately powered, after which the signal the controller signal drives the input to the first FET, providing the controller regulators with a full supply. After the host computer has "enumerated" and allowed for full power operation, the signal from the controller then drives the input to the second FET, thereby powering the rest of the drive. Also, if the USB requires the peripheral to sleep, enough voltage is provided to turn the FETs off and suspend the drive for power consumption purposes. Two components, (a capacitor and a resistor) on the gate of the second FET provide a time constant to slowly ramp the voltage to limit the inrush current from the USB supply.

In a similar manner, if the user requires the use of PCMCIA, then agin the invention utilizes the body diode (eliminating the need for alternate components) of the first and second FETs to protect the USB from a back power condition and provide controller power.

The foregoing and other objects, features and advantages of the invention will be better understood from the following more detailed description and dependent claims.

SHORT DESCRIPTION OF THE DRAWINGS

FIG. 1 is a perspective view of a disk drive with a connector having the power switching network of the present invention;

FIG. 2B shows the connector of FIG. 2A with the Centronics connector mated to its associated contacts;

DESCRIPTION OF THE PREFERRED EMBODIMENTS

FIG. 1 shows a disk drive 10 which can be the aforementioned Zip™ drive with a connector which is capable of connection to a mating connector 11 compatible with the aforementioned USB and IEEE1394 connectors. The connector 12 provides compatibility with these mating connectors.

Figure 2A:
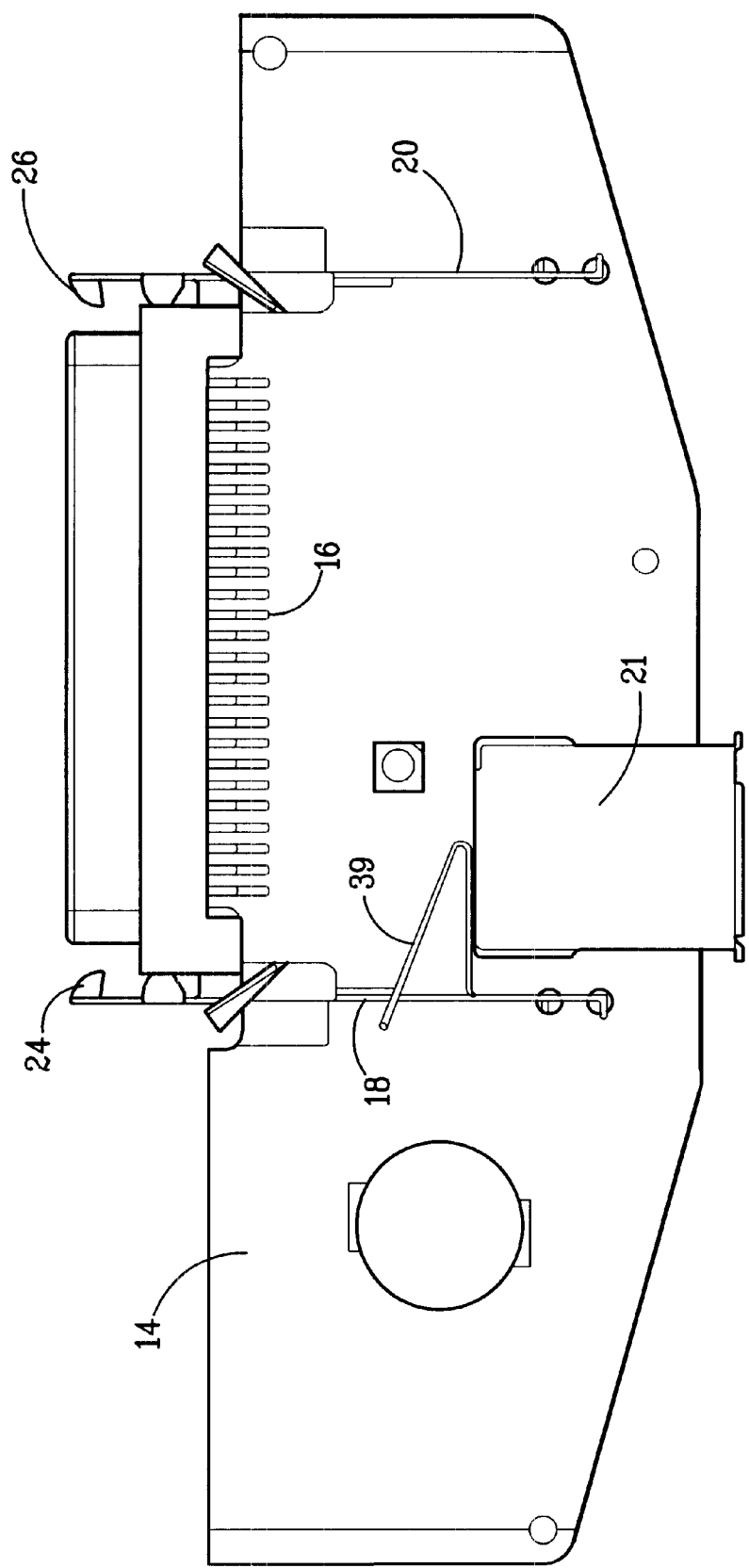
FIG. 2A shows the printed circuit board of the connector for dual bus operation.

FIGS. 2A and 2B shows the connector of co-pending application, Ser. No. 09/475,942 filed Dec. 30, 1999, Baker, et al. (Attorney's Docket IOM-5703) now U.S. Pat. No 6,305,959. It has a printed circuit board 14 having components mounted thereon. Electrical contacts 16 on the base are compatible with contacts in an electrical configuration compatible with IEEE 1394, typically in a 50 pin-mini Centronics PCMCIA connector. The board also mounts two retention arms 18 and 20 and a USB connector 21. Connector 16 and connector 21 are in a common housing.

FIG. 2B shows the printed circuit board 14 connected to a mating connector 22 on disk drive 10. Hooks 24 and 26 on retention arms 18 and 20 mate with hooks 25 and 27 on mating connector 22 to lock the connector in place during use and retain it against shock loads.

Figure 3:
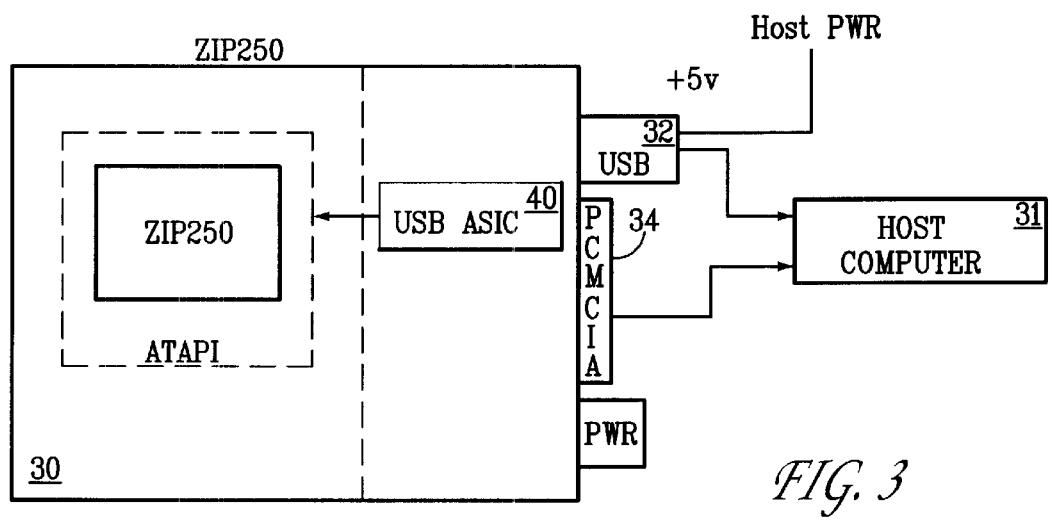
FIG. 3 is a block diagram of a dual bus computer system.

As shown in FIG. 3 a computer system includes a peripheral device 30 connected to host computer 31 through a first bus 32 which is USB standard and a second bus 34 which is PCMCIA standard.

Figure 4:
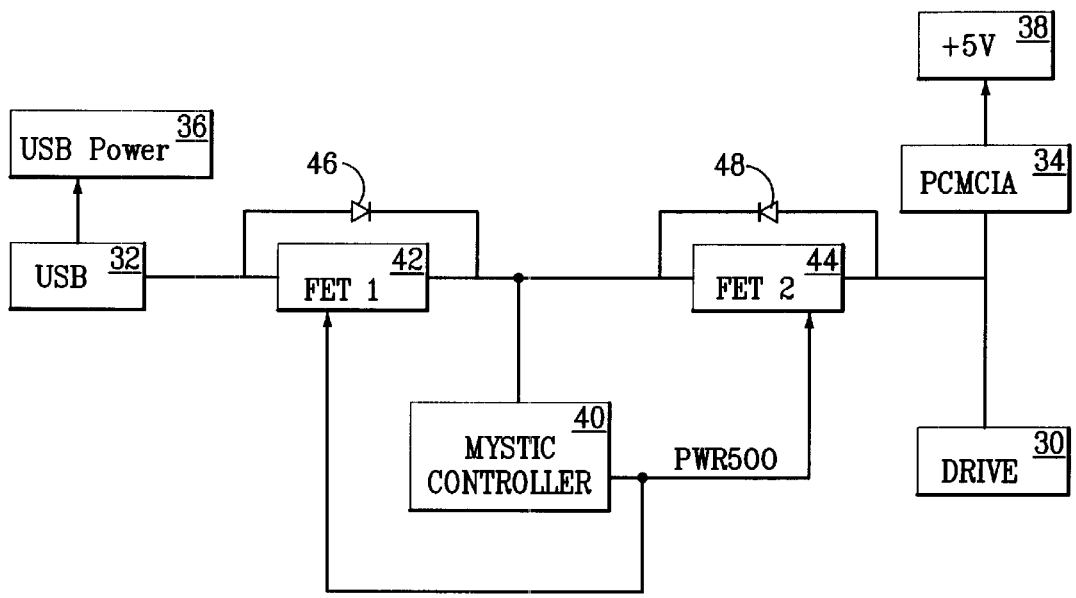
FIG. 4 is a block diagram of the switching network of the present invention.

As shown in FIG. 4, busses 32 and 34 have a first power supply 36 and a second power supply 38, respectively. In order to isolate the two power supplies the power switching network of the present invention is provided. It includes a first solid state switching device 42 and a second solid state switching device 44. A controller 40 turns solid state switching devices 42 and 44 on and off. First power supply 36, associated with USB bus 32, is connected to the peripheral device 30 through first and second switching devices 42 and 44 when they are turned on. The controller 40 turns the switching devices on when second bus 34 is not connected to the peripheral device.

The second power supply 38 associated with PCMCIA bus 34 is connected directly to the peripheral device 30 to supply power to peripheral device whenever the PCMCIA bus 30 is connected to the peripheral device.

Figure 5:
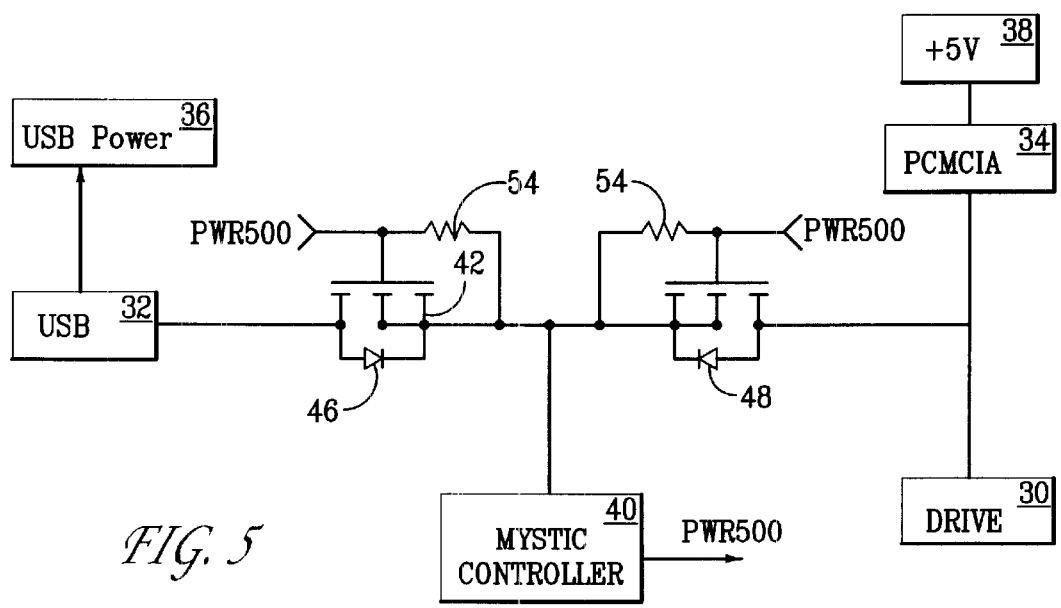
FIG. 5 is a circuit diagram of the switching network of the present invention.

As shown in FIG. 5 the switching devices 42 and 44 are Field Effect Transistors (FET's) which have the inherent body diodes 46 and 48. The body diode 48 of FET 44 isolates first power supply 36 from the second power supply 38 whenever the second power supply is connected to the peripheral device 30. The body diodes 46 and 48 are connected so that the controller 40 always has a source of power regardless of whether power supply 36 or the power supply 38 is connected to the peripheral device 30. Body diode 46 supplies power to controller 40 from the first power supply 36 and body diode 48 supplies to the controller 40 from the second power supply 38.

Controller 40 produces the signal PWR500 or PWR100 (see FIGS. 4/6) which is applied to the gates of the FET's 46 and/or 48. The PWR500 signal turns the FET's 46 and 48 on when the first, USB, connector 32 is connected to the peripheral device 30 and the second, PCMCIA, bus 34 is not connected to the peripheral device 30.

Figure 4A:
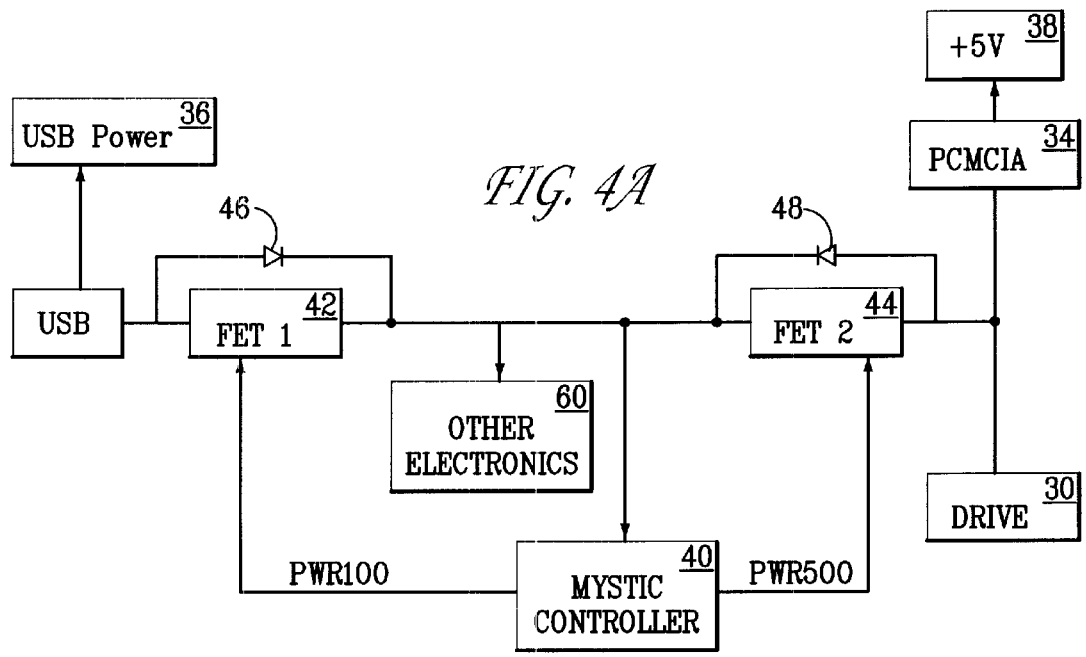
FIG. 4A is another configuration of FIG. 4.

FIG. 4A shows another configuration of FIG. 4. By using PWR100 to control the gate of FET 42, instead of PRW500, other electronics 60 that need 5 volts to be powered during the time when the USB bus only allows 100 milliamps of current can be accommodated.

If the user requires the use of USB power the controller ASIC 40 provides signals PWR 500, to control each FET 42 and 44 in the power switching circuit. Taking advantage of the body diode inherent in FET's 42 and 44, the controller 40 is immediately powered, after which PWR500 drives the input to the first FET 42, providing the controller regulators with a full power supply. After the host computer has "enumerated" and allowed for full power operation, PWR500 then drives the input to the second FET 44, thereby powering the rest of the drive. Also, if the USB requires the device (drive) to sleep, then the resistors 54 provide enough voltage to turn the FETs off and suspend the drive for power consumption purposes.

Figure 6:
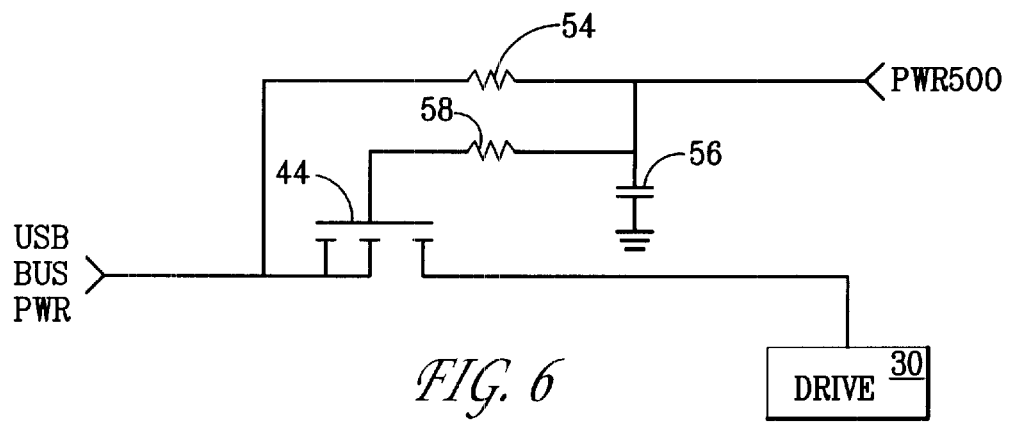
FIG. 6 shows the time constant circuit on the gate of the second FET.
Figure 7:
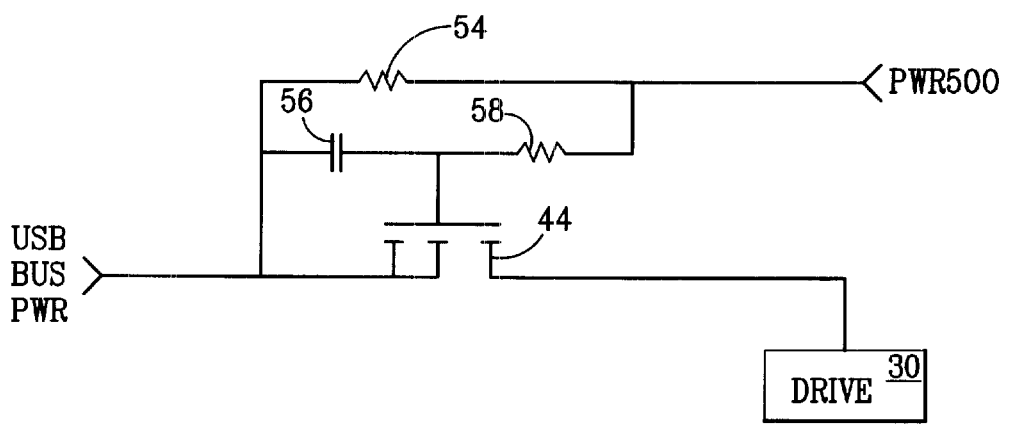
FIG. 7 shows another configuration of the circuit of FIG. 6.

As shown in FIG. 6, two components, a capacitor 56 and a resistor 58 on the gate of the second FET 44 provide a time constant to slowly ramp the voltage to limit the inrush of current from the USB supply. Another configuration of the time constant circuit including capacitor 56 and resistor 58 is shown in FIG. 7. The capacitor 56 is pulled to the source of FET 44 when using a p-channel FET and pulled to ground when using an n-channel FET. The body diode of FET 44 is eliminated to get rid of the typical 700 mb voltage drop. Controller 46 can operate on as low as 3.3 V but other electronic 60 may not have that ability.

Resistor 58 and capacitor 56 are atime constant circuit for turn on and resistors 54 and 58 and capacitor 56 are a time constant circuit for turn off. The time constant circuit of FIG. 7 is used with the configuration of FIG. 4A.

While a particular embodiment of the invention has been shown and described, various modifications are possible. All such modifications within the true spirit and scope of the invention are covered by the appended claims.

What is claimed is:

1. A computer system comprising:
   at least one peripheral device;
   first and second buses having first and second power supplies, said first and second busses being connected to said peripheral devices by connectors in a common housing; and
   a power switching network including:
      first and second solid state switching devices, said first power supply being connected to said peripheral device through said first and second switching devices, said second power supply being connected directly to said peripheral device when said second bus is connected to said peripheral device; and
      a controller for turning said first and second switching devices on and off.

2. The computer system recited in claim 1 wherein said controller turns said switching devices on when said second bus is not connected to said peripheral device.

3. The computer system recited in claim 1 wherein said switching devices are first and second field effect transistors (FET's) having an inherent body diode.

4. The computer system recited in claim 3 wherein said second FET is connected so that its body diode isolate said first power supply from said second power supply when said second power supply is connected to said peripheral device.

5. The computer system recited in claim 3 wherein said first FET is connected so that its body diode supplies power from said first power supply to said controller.

6. The computer system recited in claim 3 wherein said second FET is connected so that its body diode supplies power from said second power supply to said controller.

7. The computer system recited in claim 3 wherein said FET's have a gate which controls current supplied to said peripheral device further comprising:
   a time constant circuit on the gate of said second FET to turn said second FET on gradually to limit the current supplied to said peripheral device when said second FET is turned on.

8. The computer system recited in claim 4 wherein said transistors have a gate which controls current supplied to said peripheral device further comprising;
   a resistor connected between the gate and the source of each FET, said resistor providing enough voltage to turn the respective FET's off if said first bus carries a signal that indicates a sleep mode for said peripheral device.

* * * * *